Dec. 28, 1926.
R. B. CHILLAS, JR
1,612,572
FRACTIONAL DISTILLATION
Filed June 30, 1925
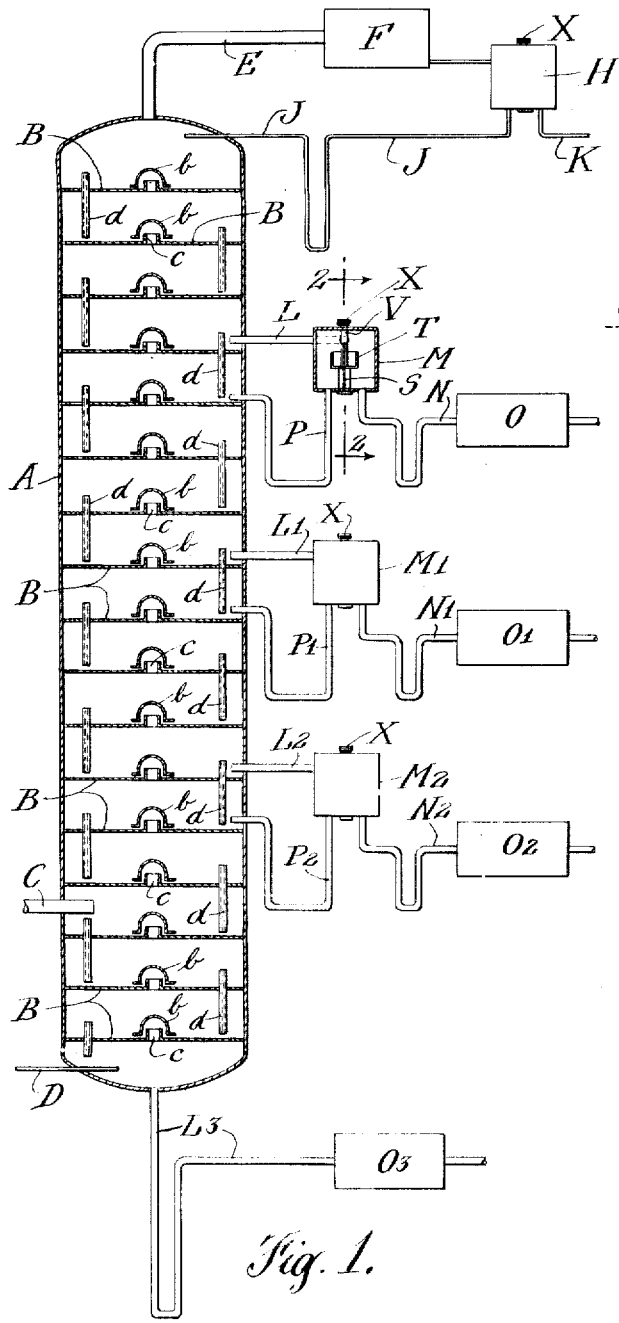
Fig. 1.
Fig. 2.
Fig. 3.
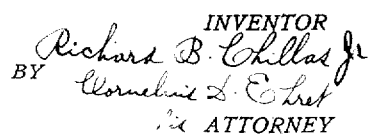
INVENTOR
Richard B. Chillas Jr
BY
ATTORNEY Patented Dec. 28, 1926.

1,612,572

UNITED STATES PATENT OFFICE.

RICHARD B. CHILLAS, JR., OF PHILADELPHIA, PENNSYLVANIA, ASSIGNOR TO THE ATLANTIC REFINING COMPANY, OF PHILADELPHIA, PENNSYLVANIA, A CORPORATION OF PENNSYLVANIA.

FRACTIONAL DISTILLATION.

Application filed June 30, 1925. Serial No. 40,536.

My invention relates to a method of and apparatus for fractionally distilling composite liquids in general, and particularly mineral oils, such as coal tar distillates or the like, and more particularly petroleum.

In accordance with my invention, the vapor, liquid, or mixture of liquid and vapor, to be fractionated, is delivered into a fractionating column or tower, of any suitable type, in which the rising vapors and refluxing liquid are so controlled that the quality of the products remains substantially constant notwithstanding variations in operating conditions.

In accordance with my invention, products of substantially constant quality are obtained by maintaining substantially constant the ratio of the quantities of the rising vapors to the quantities of refluxing liquid.

More particularly in accordance with my invention, the total or entire stream of descending or refluxing liquid is divided into streams consisting of definite percentages of the total descending liquid, one of the streams being removed as a desired product and another serving as refluxing liquid descending further in the column; and the rate of flow of each of these streams bears to the rate of flow of the vapors entering the fractionating system a constant or fixed ratio, notwithstanding variations in the quantities of said vapors entering the system per unit of time.

Further in accordance with my invention, these ratios may be arbitrarily varied by suitable mechanical adjustments and fixed at any desired values so as to produce streams of the desired qualities, these values then remaining constant notwithstanding fluctuations in the rate of vapor input.

My invention resides in a method and apparatus of the character hereinafter described and claimed.

Fractional distillation as commonly practiced, in batch operation, comprises distillation of a quantity of the composite liquid, and the passage of its vapors through a fractionating column, such as, for example, of the bubble type. The vapors leaving the column are condensed, and a portion of the condensate returned to the top of the column, in which it flows downwardly as refluxing liquid. The vapors rising in the column come into intimate contact with the descending or refluxing liquid, with resultant interchange of constituents, those of lower boiling point in the descending liquid pass into the vapor phase in exchange for which those of higher boiling point in the rising vapor pass into the liquid phase, and the eventual liquid reflux returns from the bottom of the column into the still. In such a system, other variables being eliminated, the degree of fractionation depends upon the ratio of the quantity of refluxing liquid to the quantity of rising vapors.

Where the fractionating column is utilized in a process of continuous distillation, that is, when the composition of the vapor entering the column is approximately constant, it is usually the practice to take off the desired fractions from the top of the column and to draw off the reflux from the bottom of the column as a second and higher boiling fraction. Advantage is frequently taken of the change in the composition of the reflux as it descends in the column, and one or more additional fractions are drawn off from the reflux at one or more points between the top and bottom of the column. This is generally accomplished by taking off at one or more of said intermediate points the desired amounts of desired fractions at substantially constant rates, as determined, for example, by set valves. Such system is disadvantageous in that notwithstanding fluctuations, which are almost certain to occur, in the rate of delivery into the column of the material to be fractionated, the rate of withdrawal of desired fractions remains substantially constant, with resultant variation from substantial constancy of the ratio of quantities of vapor to quantities of reflux in the several column sections or stages, and in consequence, the operating conditions in the column are changed, with resultant changes in the compositions of the desired fractions.

In accordance with my invention, however, the rate of withdrawal of a desired fraction is not constant, but the desired fraction is a substantially constant percentage of the total descending or refluxing liquid, the volume of the desired fraction varying directly with the volume of the total descending liquid, and accordingly, the reflux through the column is always substantially in the proportion required to effect products of uniform or substantially constant quality under varying operating conditions, such as changes in the rate of input of the material to be fractionated. An increase or decrease in the quantity of vapors to be fractionated in the column causes corresponding or proportional change in the quantity of refluxing liquid throughout the column.

For an understanding of my method and for an illustration of one of the various forms of apparatus utilizable in accordance with my invention, reference may be had to the accompanying drawing, in which:

Fig. 1 is a vertical sectional view of a fractionating column and flow box, with associated apparatus.

Fig. 2 is a vertical sectional view, on enlarged scale, taken on the line 2—2, Fig. 1.

Fig. 3 is a horizontal sectional view taken on the line 3—3, Fig. 2.

Referring to the drawing, A is a fractionating column provided, at suitable intervals, with the plates B, of any suitable type, as, for example, those provided with bubbler caps $b$, disposed above and spaced from the upwardly directed ports $c$. Each plate B is provided also with a tube or pipe $d$ extending therethrough to a short distance above it and to a point suitably adjacent the plate below.

It will be understood, however, that my invention is not limited as regards the type of fractionating column or tower utilized, and it will be understood that any other or equivalent type may be utilized, including a packed fractionating column or tower.

The material to be fractionated is delivered, at suitably elevated temperature, into the column A through the pipe C, preferably at a point above one or more of the lowermost plates B. When steam is utilized in the column it may be introduced through the pipe D into or adjacent the bottom of the column.

E is a vapor line or pipe connecting the top of the column with the condenser F, from which the condensate of the lowest boiling desired fraction is delivered into a flow box H, of the character hereinafter described, or which may be any other equivalent means for dividing the condensate into a stream forwardly flowing through the pipe K to storage or elsewhere and bearing a definite ratio, variable at will, to the magnitude of the reflux stream returning through the trapped pipe J into the top of the column A.

Operatively related to the column A at suitable or desired number of points vertically thereof between its top and bottom are the flow boxes M, $M^1$, $M^2$, etc. While flow boxes are indicated and more particularly described herein, it will be understood that any equivalent means may be utilized for effecting a division of the refluxing liquid into streams bearing a predetermined ratio to each other.

Each of the flow boxes is of the character of the flow box M, which comprises a closed casing R, in which is disposed a vertical partition or dividing wall S. Upon the vertical pivot shaft V, operable from the exterior by its head X, carrying the pointer or indicator W, is secured the trough or pan T, open at its front end $t$ and swingable across the member S, which to the right of the trough T, Fig. 2, extends to a suitably higher level. The partition S divides the casing R into two compartments $R^1$ and $R^2$, with which connect, respectively, the trapped pipes P and N. A pipe L delivers into the trough T the total liquid descending in the column A, and this stream is divided by the partition S into streams bearing predetermined relation to each other and entering, respectively, the compartments $R^1$ and $R^2$, from the former of which the pipe P conducts the reflux liquid back into the column A at suitable height therein; and the liquid delivered into the compartment $R^2$ is delivered through the pipe N to storage or other suitable destination after cooling, if desired, in a cooler O.

Each of the other flow boxes $M^1$, $M^2$, etc., is connected in the system by associated pipes $L^1$, $L^2$, etc., $P^1$, $P^2$, etc., and $N^1$, $N^2$, etc., coolers $O^1$, $O^2$, etc., being utilized if suitable or desirable.

By manipulation of the head X of the flow box H the proportion of the reflux liquid returned to the column through the pipe J to the forward stream of desired condensate is determinable. And similarly, in each of the flow boxes $M^1$, $M^2$, etc., by similar adjustment of its trough T with respect to its partition S, the amount of forward flowing fraction or distillate is proportioned with respect to amount returned as reflux into the column A.

When the material to be fractionated and introduced through the pipe C is to a considerable extent or wholly liquid, heat may be applied to the material in the column by any suitable means, as by steam introduced through the pipe D. When steam is utilized, the water may be separated from the condensed oil vapors between the condenser F and the flow box H, whereby only liquid oil is delivered to the flow box H.

The vapors pass upwardly through the column and thence through the pipe E to the condenser F as aforesaid; a portion of the condensate returning to the column through the pipe J as reflux. The refluxing liquid passes downwardly through the column, as through the pipes $d$, and comes into intimate contact with the rising vapors to effect the necessary interchange for fractionation, and the descending liquid becomes progressively leaner in lower boiling point constituents. At one or more points between the top and bottom of the column the entire quantity of the refluxing liquid is drawn off to a flow box, or equivalent, to effect division into streams whose magnitudes bear a fixed relation to each other, one of them constituting a desired fraction or distillate and the other utilized as reflux in its further descent through the column A.

The reflux liquid eventually reaching the bottom of the column A is drawn off through the trapped pipe $L^3$, as a desired fraction, to storage or other suitable destination, first passing through a cooler $O^3$ if suitable or desirable.

The column A and the flow boxes may be lagged or covered with suitable heat-insulating material.

The several flow boxes are in effect in series or tandem with each other, in the sense that the descending refluxing liquid passes through them in succession, the total refluxing or descending liquid for each stage or section of the column passing through the associated flow box. In effect, therefore, the refluxing or descending liquid throughout the column is subjected at suitable intervals and successively to division into streams bearing a substantially constant ratio to each other.

By a system of the character described, notwithstanding variations in the amount of material to be fractionated delivered into the column A through the pipe C per unit of time, the several fractions, and especially those taken off through the intermediate flow boxes M, $M^1$, $M^2$, etc., remain of substantially fixed quality, which characteristic results from the fact that the quantities of the rising vapors bear a substantially constant ratio to the quantities of the descending refluxing liquid in each section or stage of the column, and from the fact that for each section or stage of the column the entire stream of descending refluxing liquid is divided into streams, as aforesaid, bearing a definite ratio to each other, which ratio, however, may be changed at will from time to time by suitably adjusting the trough or troughs T.

Since the rate of flow of reflux liquid through the line J into the top of the column A bears a fixed ratio to the rate of flow of vapors upwardly through the column A, and since at each lower or intermediate stage the total reflux liquid is divided into streams bearing a fixed ratio to each other, both the rate of removal of intermediate product and the rate of flow of returned reflux liquid bear a fixed or constant ratio to the rate of flow of the vapors upwardly through the column A, notwithstanding variations in the quantities of vapors rising upwardly through the column A per unit of time.

The material charged through the pipe C may be mineral oil, such as a mixture of coal tar products to be fractionated; or crude petroleum, such as a mid-continent or mixed base crude, or a paraffine base crude; or the material may be a mixture of petroleum components or products.

While the flow boxes M, $M^1$, $M^2$, etc., are described as if located external to the column A, which generally is preferable, it will be understood that the descending refluxing liquid may be divided into the proportioned streams within the column A itself.

What I claim is:

1. In the art of fractionally distilling a composite liquid involving interchange between rising vapors and descending refluxing liquid, the method which comprises removing a predetermined percentage of the total descending liquid reflux as a desired fraction, utilizing the remainder as refluxing liquid in its further descent in fractionating relation to rising vapors, and maintaining said percentage substantially constant irrespective of variations in the rate of flow of said vapors.

2. In the art of fractionally distilling a composite liquid involving interchange between rising vapors and descending refluxing liquid, the method which comprises dividing the total liquid reflux at a predetermined point in its descent into streams bearing a fixed ratio to each other, and utilizing one of said streams as reflux in its further descent in fractionating relation to rising vapors.

3. In the art of fractionally distilling composite liquids, the method which comprises drawing off and condensing vapors of the lowest boiling point fraction, returning a portion of the condensate as descending reflux in fractionating relation to rising vapors, at each of one or more predetermined points in the descent of the refluxing liquid removing a predetermined percentage of the total thereof, utilizing the remainder as refluxing liquid in its further descent in fractionating relation to rising vapors, and maintaining said percentage substantially constant irrespective of variations in the rate of flow of the total reflux liquid.

4. In the art of fractionally distilling composite liquids, the method which comprises drawing off and condensing vapors of the lowest boiling point fraction, returning a portion of the condensate as descending reflux in fractionating relation to rising vapors, at each of one or more predetermined points in the descent of the refluxing liquid dividing the total liquid reflux in its descent into streams bearing a fixed ratio to each other, and utilizing one of said streams as reflux in its further descent in fractionating relation to rising vapors.

5. In the art of fractionally distilling a composite liquid involving interchange between rising vapors and descending refluxing liquid, the step which comprises maintaining substantially constant the ratio of the quantity of rising vapors to the quantity of descending refluxing liquid at each successive region in the descent thereof.

6. In the art of fractionally distilling a composite liquid involving interchange between rising vapors and descending refluxing liquid, the step which comprises maintaining substantially constant, notwithstanding variations in the rate of input of the material to be fractionated, the ratio of the quantity of rising vapors to the quantity of descending refluxing liquid at each successive region in the descent thereof.

7. Apparatus for fractionally distilling a composite liquid comprising a fractionating column, means for introducing the material to be fractionated into said column, means for withdrawing vapor from the column, means for introducing into said column refluxing liquid, and means for withdrawing at a point between the top and bottom of said column at a rate substantially proportional to the rate of flow of vapors upwardly through said column a predetermined percentage of the total descending refluxing liquid.

8. Apparatus for fractionally distilling a composite liquid comprising a fractionating column, means for introducing the material to be fractionated into said column, means for introducing into said column refluxing liquid, means for withdrawing vapor from the column, means for dividing at a point between the top and bottom of said column the total refluxing liquid into streams whose magnitudes bear a substantially fixed ratio to each other, means for withdrawing one of said streams, and means for directing the other of said streams to operate as refluxing liquid in its further descent in fractionating relation to rising vapors.

9. Apparatus for fractionally distilling a composite liquid comprising a fractionating column, means for delivering into said column the material to be fractionated, means for withdrawing vapors of the lowest boiling point constituents, means for withdrawing residuum from the bottom of said column, and means at one or more points intermediate the points of withdrawal of said vapors and residuum for removing at a rate substantially proportional to the rate of flow of vapors upwardly in said column a predetermined percentage of the total descending refluxing liquid.

10. Apparatus for fractionally distilling a composite liquid comprising a fractionating column, means for introducing the material to be fractionated into said column, means for withdrawing vapors of the lowest boiling point constituents, means for condensing said vapors, means for returning a substantially fixed percentage of the condensate into said column as refluxing liquid, and means intermediate the top and bottom of said column for removing a substantially fixed percentage of the total descending refluxing liquid.

11. Apparatus for fractionally distilling a composite liquid comprising a fractionating column, means for introducing the material to be fractionated into said column, means for withdrawing vapor from the column, means for introducing into said column refluxing liquid, means for maintaining at any stage between the top and bottom of said column substantially constant the ratio of the quantity of the rising vapor to the quantity of descending refluxing liquid, and means for withdrawing a substantially fixed percentage of said liquid.

12. In the art of fractionally distilling a composite liquid involving interchange between rising vapors and descending reflux liquid, the method which comprises removing a portion of the total descending reflux liquid at a predetermined point, and maintaining substantially constant the ratio of the quantity of liquid so removed to the total of the reflux liquid irrespective of variations in the rate of flow of the total reflux liquid.

13. In the art of fractionally distilling composite liquid involving interchange between rising vapors and descending reflux liquid, the method which comprises removing a portion of the total descending reflux liquid at a predetermined point, and maintaining substantially constant the ratio of the quantity of liquid so removed to the total of the reflux liquid irrespective of variations in the rate of flow of the rising vapors.

14. In the art of fractionally distilling a composite liquid involving interchange between rising vapors and descending reflux liquid, the method which comprises condensing vapors, dividing the condensate into streams whose rates of flow bear a substantially fixed relation to each other, returning one of the streams as reflux liquid, removing a portion of the total descending reflux liquid at a predetermined point, and maintaining substantially constant the ratio of the quantity of liquid so removed to the total reflux liquid irrespective of variations in the rate of flow of the rising vapors.

15. Apparatus for fractionally distilling a composite liquid comprising a fractionating column, means for introducing the material to be fractionated into said column, means for withdrawing vapor from the column, means for introducing reflux liquid into said column, and means for removing a portion of the reflux liquid which is a substantially fixed proportion of the total reflux liquid irrespective of variations in the rate of flow of the total reflux liquid.

16. Apparatus for fractionally distilling a composite liquid comprising a fractionating column, means for introducing the material to be fractionated into said column, means for withdrawing vapor from the column, means for condensing the vapor withdrawn, means for dividing the condensate into streams which bear a substantially fixed proportion to each other, means for returning one of said streams into the column as reflux liquid, and means for removing at a point intermediate the top and bottom of the column a portion of the reflux liquid which is a substantially fixed proportion of the total reflux liquid irrespective of the rate of flow of vapors in said column.

RICHARD B. CHILLAS, Jr.

column, and means for removing a portion of the reflux liquid which is a substantially fixed proportion of the total reflux liquid irrespective of variations in the rate of flow of the total reflux liquid.

16. Apparatus for fractionally distilling a composite liquid comprising a fractionating column, means for introducing the material to be fractionated into said column, means for withdrawing vapor from the column, means for condensing the vapor withdrawn, means for dividing the condensate into streams which bear a substantially fixed proportion to each other, means for returning one of said streams into the column as reflux liquid, and means for removing at a point intermediate the top and bottom of the column a portion of the reflux liquid which is a substantially fixed proportion of the total reflux liquid irrespective of the rate of flow of vapors in said column.

RICHARD B. CHILLAS, JR.

DISCLAIMER.

1,612,572.—*Richard B. Chillas, Jr.*, Philadelphia, Pa. FRACTIONAL DISTILLATION. Patent dated December 28, 1926. Disclaimer filed April 26, 1928, by the patentee, assignee, *The Barrett Company,* assenting.

Hereby disclaims claims 1 to 6, inclusive, 8, 10, 12, 13, and 14 of said patent, and does hereby further disclaim any interpretation of claims 7, 9, 11, 15, and 16 which fails to confine each of said claims to means such as flow box H, whereby the ratio of the portion of reflux liquid removed to the total reflux liquid is automatically predetermined without the necessity of manual adjustments to compensate for changes in the rate of flow of the rising vapors or total reflux liquid.

[*Official Gazette May 15, 1928.*]

DISCLAIMER.

1,612,572.—*Richard B. Chillas, Jr.*, Philadelphia, Pa. FRACTIONAL DISTILLATION. Patent dated December 28, 1926. Disclaimer filed April 26, 1928, by the patentee, assignee, *The Barrett Company*, assenting.

Hereby disclaims claims 1 to 6, inclusive, 8, 10, 12, 13, and 14 of said patent, and does hereby further disclaim any interpretation of claims 7, 9, 11, 15, and 16 which fails to confine each of said claims to means such as flow box H, whereby the ratio of the portion of reflux liquid removed to the total reflux liquid is automatically predetermined without the necessity of manual adjustments to compensate for changes in the rate of flow of the rising vapors or total reflux liquid.

[*Official Gazette May 15, 1928.*]